United States Patent [19]

Schwarz et al.

[11] 4,374,172
[45] Feb. 15, 1983

[54] SOUND INSULATING MATERIAL

[75] Inventors: Herwig. J. Schwarz, Walldorf; Hans-Jürgen H. Burde, Neckargemund-Waldhilsbach; Günter Minet, Heidelberg, all of Fed. Rep. of Germany

[73] Assignee: Teroson GmbH, Heidelberg, Fed. Rep. of Germany

[21] Appl. No.: 182,543

[22] Filed: Aug. 29, 1980

Related U.S. Application Data

[63] Continuation of Ser. No. 968,872, Dec. 12, 1978, abandoned.

[30] Foreign Application Priority Data

Dec. 19, 1977 [DE] Fed. Rep. of Germany ....... 2756622

[51] Int. Cl.³ .......................... B32B 5/14; B32B 5/18; B32B 5/22; B32B 7/02
[52] U.S. Cl. .................................. 428/308.4; 181/284; 181/288; 181/294; 181/DIG. 1; 428/317.9; 428/322.7
[58] Field of Search ............... 181/286, 284, 288, 290, 181/294, 296, DIG. 1; 521/53, 54, 57, 59; 427/244, 256, 265, 282, 312; 428/195, 305, 310, 311, 315, 212, 304.4, 306.6, 308.4, 311.1, 311.5, 317.9, 322.7

[56] References Cited

U.S. PATENT DOCUMENTS

| | | | |
|---|---|---|---|
| 2,955,056 | 10/1960 | Knox | 428/311 |
| 3,070,476 | 12/1962 | Miller | 428/195 |
| 3,471,419 | 10/1969 | Ehrlich | 521/54 |
| 3,542,638 | 11/1970 | Kenny | 428/311 |
| 3,627,622 | 12/1971 | Vega | 428/311 |
| 3,944,704 | 3/1976 | Dirks | 428/311 |
| 3,949,137 | 4/1976 | Akrongold et al. | 428/311 |
| 4,034,137 | 7/1977 | Hofer | 428/311 |
| 4,042,751 | 8/1977 | Roth | 428/311 |
| 4,046,936 | 9/1977 | Schachter | 428/195 |
| 4,051,296 | 9/1977 | Windecker | 428/311 |
| 4,061,820 | 12/1977 | Magid | 428/311 |
| 4,070,520 | 1/1978 | Volz et al. | 428/311 |
| 4,079,170 | 3/1978 | Cluff | 428/311 |
| 4,082,703 | 4/1978 | Duffy et al. | 521/54 |
| 4,125,664 | 11/1978 | Giesemann | 428/311 |

*Primary Examiner*—William J. Van Balen
*Attorney, Agent, or Firm*—William L. Baker

[57] ABSTRACT

The invention relates to a sound damping material in the shape of foils or strips comprising open-pored foam material impregnated with different quantities of a viscoelastic compound, which is intended for application to attenuated structures, particularly automobile body panels.

8 Claims, 2 Drawing Figures

SOUND INSULATING MATERIAL

This is a continuation of application Ser. No. 968,872, filed Dec. 12, 1978, now abandoned.

BACKGROUND OF INVENTION

Elastic structures such as for example thin body-work and cabin panels irradiate high proportions of airborne sound of different frequencies accompanied by airborne sound generation or structure-borne sound action. This mainly low frequency noise in the range of especially 100 to 1000 Hz has hitherto been combatted by applying damping materials. This function has been fulfilled by layers of synthetic resin and/or bitumen-based materials applied by spraying and which solidify in a pliable or rigid manner. In addition, viscoelastic damping foils based on bitumen and/or filled synthetic resins, as well as bituminous felt with and without additional damping layers are used.

It is a common feature of all known laminar materials that only a uniform damping layer can be applied. The same applies with respect to the spraying process because it is only difficultly possible therewith to obtain different coating thicknesses in a planned manner. Furthermore to obtain a high structure-borne sound damping with such layers a relatively high weight in the range of approximately 2 to 10 $kg/m^2$ is necessary.

OBJECTS OF THE INVENTION

It is an object of the invention to develop a sound insulating material by means of which it is possible to cover in a planned manner areas of the structures to be insulated of different thicknesses and oscillating at different frequencies with a material, whose damping varies zonally between zero and high dissipation factors. Damping must be achieved at extremely low weights per unit area of 0.5 to 2.5 $kg/m^2$.

BRIEF DESCRIPTION OF INVENTION

Therefore the invention relates to a sound insulating material in the shape of foils or strips of open-pored foam, which is characterized in that it is impregnated over its total surface area with different quantities of a viscoelastic material. The quantity of impregnating compound can vary in the individual areas of the foam material between zero and the saturation point of the foam. In addition, an acoustic optimization of the material is possible through using compounds of different composition for impregnating individual areas of the material.

Suitable foam materials are open-pored polyurethane, polyolefin or PVC foams. It is also possible to use foams comprising bonded foam particles, the latter comprising identical or different materials and which can therefore have identical or different physical characteristics. It is also possible to granulate the waste material obtained in the manufacture or processing of the sound insulating material according to the invention and form the same into a composite foam. The material can be further modified through processing foam particles of different chemical composition to form a composite material.

The foam materials are impregnated with viscoelastic raw materials, e.g. polyolefins, organic resins, waxes (e.g. petroleum waxes or synthetic hydrocarbon waxes), ethylene/vinyl acetate copolymers, or mixtures of the foregoing materials which preferably contain inorganic fillers such as chalk, ground shale, barite and the like.

The impregnating compound is selected as a function of the acoustic requirements in such a way that it provides maximum damping at specific temperatures and/or structure-borne sound frequencies of the damped structure to be insulated. It is essential for the invention that as regards quantity and optionally type the viscoelastic compound, it is introduced in zonally differing manner to the foam, which leads to a specific matching to the acoustic problems at the particular place of use. It is also possible to apply the impregnating compound in a nonuniform manner, e.g. in a progressively increasing or decreasing manner over the thickness of the foam material, but it is obviously possible to spread it uniformly over the thickness.

In the case of a 10 mm thick foam the quantity of impregnating compound can vary between zero and approximately 5 $kg/m^2$ (saturation point).

A further acoustic adaptation of the material can take place by using a foam having a differing thickness, for example thicknesses between approximately 2 and 25 mm. Such a foam can easily be produced by cutting from a foam block material, followed by careful adaptation to the structure to be clad.

The particularly low weight of the sound insulating material according to the invention whilst simultaneously providing high damping is made possible in that the skeleton and inner walls of the open-pored foam are coated with viscoelastic damping material in such a way that despite the low over all weight a high degree of rigidification and in the case of deformation by flexural waves high losses by conversion into heat are obtained.

Hitherto most automobile bodies have had a sound insulation which is well below the theoretical values expected on the basis of the particular mass. Even when excluding losses due to cracks, slits and the like socalled coincidence losses due to a too high bending strength of the deformed panels lead to a reduction of the sound insulation. Through the use of the relatively lightweight sound insulating materials made from impregnated foam according to the invention it is possible to directly reduce the coincidence losses due to the improved damping of the structure as opposed to increasing the sound insulation accompanied by unchanged coincidence losses and as a result the latently present, but reduced sound insulation is improved.

The manufacture of the sound insulating material according to the invention can take place in particularly simple manner by zonally covering a foam with foils of an impregnating compound or of different impregnating materials, whereby the impregnation quantity can be varied by applying several layers, for example 2, 3 or 4 layers. By heating the material to a temperature above the softening point of the particular compounds impregnation of the foam is achieved, because the molten material penetrates the open-pored structure.

In order to optimize the sound insulating material for specific structures to be clad the magnitude of the necessary damping is measured at a relatively large number of points in g (g=acceleration due to gravity) via the acceleration values of the surface of the structure. The determination of the acceleration values (vibrational amplitudes) and phase angle at the individual measuring points of the sound-radiating surface is performed e.g. by means of piezoelectric vibration pickups. In addition, acoustic sources and negative sources are identified by means of intensity analyses. The foam intended for the structure is subsequently differently impregnated in accordance with the measured values.

In order to facilitate the use of the sound insulating material according to the invention the latter is preferably coated on one or both sides with an adhesive, whereby the adhesive layer is preferably optimize from the viscoelastic standpoint, i.e. its viscoelastic characteristics are particularly matched so that they make a not unimportant contribution to the sound insulation.

Practical application can take place at ambient temperature with a pressure sensitive adhesive. If high temperature application is possible the sound insulating material can be melted on with the aid of heat-activatable adhesive layers or fusion adhesives.

The sound insulating material can also be coated on one or both sides with a textile material, for example a non-woven or woven fabric serving as reinforcement and/or support. In the case of vehicle building particular preference is given to materials which are coated with a carpet or composite carpet material. In connection with the acoustic optimization of the material it is obviously necessary to take account of the weight of such a carpet layer.

DETAILED DESCRIPTION OF THE INVENTION

Figure 1:
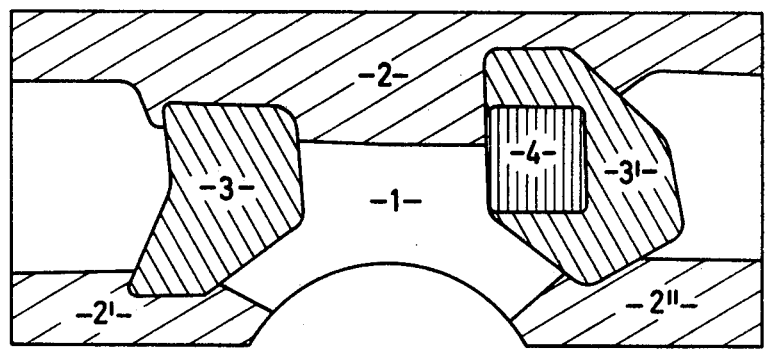
Figure 2:
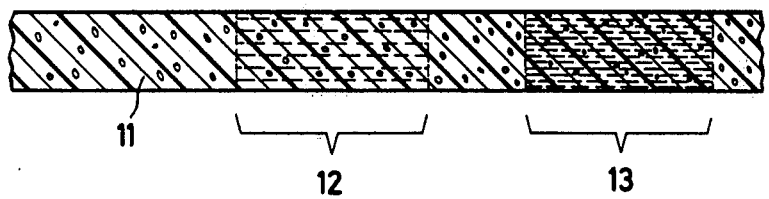

The following drawings serve to further illustrate the invention and shows:

FIG. 1 a plan view of a foam layer with a zonally differing covering with an impregnating material foil prior to the impregnation;

FIG. 2 a section through a portion of a sound insulating material according to the invention.

In the areas 1 the foam layer of FIG. 1 is free from damping composition. A single layer of a damping composition foil is applied to areas 2, 2' and 2''. Damping is increased in areas 3, 3' by using a double layer, corresponding to a double quantity of damping composition. Finally in area 4 a triple layer of the damping composition foil is applied, corresponding to extremely high damping. The individual foils are melted by heating and consequently penetrate the foam, so that following cooling the latter can be used as a sound insulating material.

FIG. 2 shows a section through a material according to the invention. In area 12 the foam layer is for example impregnated with 1.2 kg/m$^2$ and in area 13 with 2.0 kg/m$^2$ of damping compositions, so that in these areas the insulating material has a correspondingly high damping and in the non-impregnated areas exhibits optimum sound insulation.

We claim:

1. A sound insulating material for application to structures to be acoustically insulated, which structures possess areas oscillating at differing frequencies and therefore present differing acoustic requirements, said insulating material consisting of a single, non-laminated layer of an open-pored foam or a layer of open-pored foam having a coating of textile material laminated to one or both surfaces thereof, said layer of foam being impregnated prior to application to said structures with a viscoelastic material so that said viscoelastic material penetrates the pores of the foam, said impregnation being in a non-uniform manner across at least one surface of said foam such that the quantity of said viscoelastic material across said surface varies in accordance with said differing acoustic requirements of said structures, said non-uniform impregnation further being in a planned manner such that upon application to said structures, the areas of said foam containing the greater quantities of said viscoelastic material correspond to the areas of said structures requiring greater sound damping, said viscoelastic material impregnating compound having different chemical compositions in individual areas in and on the surface of said foam.

2. A sound insulating material for application to structures to be acoustically insulated, which structures possess areas oscillating at differing frequencies and therefore present differing acoustic requirements, said insulating material consisting of a single, non-laminated layer of an open-pored foam or a layer of open-pored foam having a coating of textile material laminated to one or both surfaces thereof, said layer of foam being impregnated prior to application to said structures with a viscoelastic material so that said viscoelastic material penetrates the pores of the foam, said impregnation being in a non-uniform manner across at least one surface of said foam such that the quantity of said viscoelastic material across said surface varies in accordance with said differing acoustic requirements of said structures, said non-uniform impregnation further being in a planned manner such that upon application to said structures, the areas of said foam containing the greater quantities of said viscoelastic material correspond to the areas of said structures requiring greater sound damping, said foam comprising bonded foam particles, said particles comprising foam particles of different chemical and physical characteristics.

3. A sound insulating material for application to structures to be acoustically insulated, which structures possess areas oscillating at differing frequencies and therefore present differing acoustic requirements, said insulating material consisting of a single, non-laminated layer of an open-pored foam or a layer of open-pored foam having a coating of textile material laminated to one or both surfaces thereof, said layer of foam being impregnated prior to application to said structures with a viscoelastic material so that said viscoelastic material penetrates the pores of the foam, said impregnation being in a non-uniform manner across at least one surface of said foam such that the quantity of said viscoelastic material across said surface varies in accordance with said differing acoustic requirements of said structures, said non-uniform impregnation further being in a planned manner such that upon application to said structures, the areas of said foam containing the greater quantities of said viscoelastic material correspond to the areas of said structures requiring greater sound damping, the quantity of said viscoelastic material across the surface of said foam further varying from zero to the saturation of said foam such that said material has high damping characteristics in impregnated areas and air borne sound insulation characteristics in non-impregnated areas, said viscoelastic material being prepared from (1) a viscoelastic raw material selected from the group consisting of organic resins, petroleum waxes, synthetic hydrocarbon waxes, and mixtures thereof, in admixture with (2) an inorganic filler selected from the group consisting of chalk, ground shale, barite and mixtures thereof.

4. The sound insulation material of claim 1 wherein the thickness of the foam layer differs zonally.

5. The sound insulating material of claim 1 wherein the foam is selected from the group consisting of polyurethane foam and polyolefin foam.

6. The sounding insulating material of claim 2 wherein at least one surface of said foam is coated with a woven or non-woven textile serving as a reinforcement.

7. The sound insulating material of claim 6 wherein said textile is a carpet type material.

8. The sound insulating material of claim 7 affixed to an automobile body panel.

* * * * *